United States Patent
Eicken et al.

(10) Patent No.: US 10,574,523 B2
(45) Date of Patent: Feb. 25, 2020

(54) SYSTEMS AND METHODS FOR CLOUD-DEPLOYMENTS WITH IMPERATIVES

(71) Applicant: RightScale Inc., Santa Barbara, CA (US)

(72) Inventors: Thorsten von Eicken, Santa Barbara, CA (US); Raphael George Jacques Simon, Santa Barbara, CA (US)

(73) Assignee: RightScale Inc., Santa Barbara, CA (US)

( * ) Notice: Subject to any disclaimer, the term of this patent is extended or adjusted under 35 U.S.C. 154(b) by 629 days.

(21) Appl. No.: 14/996,393

(22) Filed: Jan. 15, 2016

(65) Prior Publication Data

US 2017/0207968 A1 Jul. 20, 2017

(51) Int. Cl.
| | | |
|---|---|---|
| *H04L 29/08* | (2006.01) | |
| *H04L 12/24* | (2006.01) | |
| *H04L 29/06* | (2006.01) | |

(52) U.S. Cl.
CPC .......... *H04L 41/0843* (2013.01); *H04L 67/10* (2013.01); *H04L 67/20* (2013.01); *H04L 67/42* (2013.01)

(58) Field of Classification Search
CPC ................................ H04L 67/10; H04L 67/42
USPC ........................................................ 709/203
See application file for complete search history.

(56) References Cited

U.S. PATENT DOCUMENTS

| | | | |
|---|---|---|---|
| 8,238,256 | B2 | 8/2012 | Nugent |
| 8,638,674 | B2 | 1/2014 | Nugent |
| 9,176,773 | B2 | 11/2015 | Fries et al. |
| 9,178,766 | B2 | 11/2015 | Kramer et al. |

(Continued)

OTHER PUBLICATIONS

Gao et al.,"An Energy and Deadline Aware Resource Provisioning, Scheduling and Optimization Framework for Cloud Systems", University of Southern California, Los Angeles, USA (10 Pages).

(Continued)

*Primary Examiner* — Vivek Srivastava
*Assistant Examiner* — Sibte H Bukhari
(74) *Attorney, Agent, or Firm* — Knobbe, Martens, Olson & Bear, LLP (57) ABSTRACT

Systems and methods for facilitating cloud-computing provisioning using deployment templates. A deployment management system receives a deployment template that includes a declarative portion specifying a plurality of resources to be deployed and an imperative portion specifying at least one procedure for adding, reconfiguring, or terminating a resource. The deployment management system generates an enumeration of a set of resources deployed prior to implementing a transition based on the deployment template, and generates a second enumeration of resources prospectively representative of a deployment conformant with the template subsequent to implementing the transition. The deployment management system identifies difference between the enumerations and generates a transition plan including a sequence of procedures for implementing the deployment template. In some implementations, an administrator can modify the transition plan. In some implementations, the transition plan includes conditional logic sequences and/or operations triggered by events.

26 Claims, 6 Drawing Sheets

(56) References Cited

U.S. PATENT DOCUMENTS

| | | | |
|---|---|---|---|
| 2006/0080413 A1* | 4/2006 | Oprea | G06F 8/61 709/220 |
| 2009/0319497 A1 | 12/2009 | Bolognese et al. | |
| 2015/0134716 A1 | 5/2015 | Nugent | |
| 2015/0169373 A1 | 6/2015 | Salsburg et al. | |
| 2015/0286969 A1 | 10/2015 | Warner et al. | |
| 2015/0317169 A1 | 11/2015 | Sinha et al. | |
| 2015/0373097 A1* | 12/2015 | Konkus | H04L 67/1025 709/203 |
| 2016/0044035 A1* | 2/2016 | Huang | H04L 63/0272 726/4 |

OTHER PUBLICATIONS

Laszewski et al., "Design of a Dynamic Provisioning System for a Federated Cloud and Bare-metal Environment", Indiana University, Bloomington, IN (8 pages).

Ma et al., "A Declarative Approach to Distributed Computing: Specification, Execution and Analysis", Universitat Pompeu Fabra, Imperial College London IBM Waston Laboratory, US (17 Pages).

Mell & Grance, "The NIST Definition of Cloud Computing: Recommendations of the National Institute of Standards and Technology", NIST US Department of Commerce, Special Publication 800-145, Sep. 2011, Gaithersburg, MD (7 Pages).

\* cited by examiner

Figure 1

```
name "Example Deployment"                                                    ~200
rs_ca_ver 20160229
short_description "An example deployment"

output "ssh_link" do
  label "SSH link to your server"
  category "Output"
end
```

```
resource "server", type: "server" do                                         ~220
  name "Generic Server"
  cloud "Cloud-1"
  server_template find("DefaultServerTemplate(v9.8)", revision: 23)
  inputs do {
    "SEC_UPDATES" => "text:enable" # Enable security updates
  } end
end resource "app_server", type: "server_array" do
  name "App Server"
  inputs do {
    "app_php/db/host"    => "env:Database Server:PRIVATE_IP",
    "app_php/db/schema"  => "text:app_test",
    "app_php/db/pwd"     => "cred:C1_APP_PWD",
    "app_php/db/user"    => "cred:C1_APP_USERNAME",
    "app_php/listen_port" => "text:8088",
  } end
  state "enabled"
  elasticity_params do {
    "bounds" => { "min_count" => 1, "max_count" => 5 },
  } end
end
```

```
operation "enable" do
  description "Get information once the app has been launched"
  definition "enable"
  # Update the links provided in the outputs.
  output_mappings do {
    $ssh_link => $server_ip_address,
  } end
end
```

```
define enable(@server) return $server_ip_address do                          ~240
  while equals?(@server.current_instance().public_ip_addresses[0], null) do
    sleep(10)
  end
  $server_addr = @server.current_instance().public_ip_addresses[0]
  $server_ip_address = join(["rs@", $server_addr])
end
```

SYSTEMS AND METHODS FOR CLOUD-DEPLOYMENTS WITH IMPERATIVES

BACKGROUND

Cloud computing enables an end-user to remotely use computing resources, without requiring the end-user to directly control or manage the underlying hardware for the computing resources. For example, an end-user can remotely instantiate virtual servers running software specified by the end-user. The end-user can be, for example, a customer of a third-party cloud computing service provider, where the end-user has no ownership of the underlying hardware. These cloud computing service providers frequently provide additional special-purpose servers or services for interactive use by the customer or the customer's software running on the virtual servers. Examples of cloud computing service providers include, for example, Amazon.com, Inc. (e.g., Amazon Web Services), Rackspace Hosting, Inc. (e.g., Rackspace Cloud), Google Inc. (e.g. Google Compute Engine), and Microsoft Corp. (e.g., Windows Azure). Cloud computing service providers may provide multi-tenant clouds, or may provide dedicated infrastructure to a single tenant. Cloud computing service providers may also be referred to as hosts, hosting providers, service-host providers, or the like.

SUMMARY

Aspects and embodiments of the present disclosure are directed to systems and methods for facilitating cloud-computing provisioning using deployment templates. A deployment management system receives a deployment template that can include a declarative portion specifying a plurality of resources to be deployed and can include an imperative portion specifying at least one procedure for adding, reconfiguring, or terminating a resource. The deployment management system generates an enumeration of a set of resources deployed prior to implementing a transition based on the deployment template, and generates a second enumeration of resources prospectively representative of a deployment conformant with the template subsequent to implementing the transition. The deployment management system identifies difference between the enumerations and generates a transition plan including a sequence of procedures for implementing the deployment template. In some implementations, an administrator can modify the transition plan. In some implementations, the transition plan includes conditional logic sequences and/or operations triggered by events.

At least one aspect of the disclosure is directed to a method that includes receiving, by a deployment management system comprising at least one computer processor, a deployment template that includes a declarative portion specifying a plurality of resources to be deployed in one or more computing clouds, and an imperative portion specifying at least one customization overriding a default procedure for a resource. The default procedure can be, for example, one of: a procedure for adding the resource, a procedure for changing a configuration for the resource, or a procedure for terminating the resource. The customization can be, for example, a custom procedure differing from the default procedure. The method further includes generating a first enumeration of a set of resources deployed in the one or more computing clouds at a first moment in time prior to implementing a transition based on the deployment template, the first enumeration representative of a first state and generating a second enumeration of the plurality of resources described by the deployment template prospectively representative of a second state conformant with the deployment template at a second moment in time subsequent to implementing the transition. The method further includes determining, based on a comparison of the first enumeration and the second enumeration, a difference between the first state and the second state and generating, by the deployment management system, a transition plan for transitioning from the first state to the second state. The transition plan can include, for example, a sequence of procedures for implementing the deployment template.

In some implementations of the method, the imperative portion specifies a trigger-based operation and the method further includes executing the trigger-based operation responsive to detecting a trigger-event for the trigger-based operation. Furthermore, in some implementations, the method also includes executing the trigger-based operation during execution of the sequence of procedures.

In some implementations, the method includes generating an initial transition plan for transitioning from the first state to the second state, providing the initial transition plan to a client device, receiving a modification instruction from the client device, generating a modified transition plan based on the initial transition plan and the received modification instruction, and using the modified transition plan as the transition plan for transitioning from the first state to the second state. In some implementations, the method further includes providing the initial transition plan to the client device as a script and receiving the modification instruction as one of: edits to the script or a replacement script.

Some implementations of the method include managing at least one resource by transmitting authenticated commands to a third-party computing cloud. Some implementations of the method include executing the transition plan using commands authenticated on behalf of a user. Some implementations of the method include executing the sequence of procedures included in the transition plan. In some implementations of the method, the deployment template specifies, for each of the plurality of resources, a respective resource type and configuration. In some such implementations, the method includes determining the one or more differences between the first state and the second state by identifying at least one of: a change in a number of resources of a first resource type or a change in a first resource configuration.

In some implementations of the method, the sequence of procedures for implementing the deployment template includes an ordered set of actions, with each action in the ordered set of actions designating a respective procedure to apply to a respective resource, and at least one action in the ordered set of actions designating a customized procedure overriding a default procedure for the respective resource. In some implementations of the method, the transition plan is stored in an acyclic-graph data structure such that each graph node represents an action and each directed graph vertex represents a sequence ordering. In some implementations, the method includes parsing the deployment template. In some such implementations, the data structure is stored in a computer-readable memory local to the deployment management system. In some implementations, the data structure is stored in a separate memory, e.g., a network-accessible memory such as may be provided by a networked server or cloud-computing resource.

At least one aspect of the disclosure is directed to a system that includes one or more computing processors and a computer-readable memory storing computer-executable instructions that, when executed by the one or more computing processors, cause the one or more computing processors to receive a deployment template that includes a declarative portion specifying a plurality of resources to be deployed in one or more computing clouds and an imperative portion specifying at least one customization overriding a default procedure for a resource. The default procedure can be, for example, one of: a procedure for adding the resource, a procedure for changing a configuration for the resource, or a procedure for terminating the resource. The customization can be, for example, a custom procedure differing from the default procedure. The instructions further include instructions that, when executed by the one or more computing processors, cause the one or more computing processors to generate a first enumeration of a set of resources deployed in the one or more computing clouds at a first moment in time prior to implementing a transition based on the deployment template, the first enumeration representative of a first state and generate a second enumeration of the plurality of resources described by the deployment template prospectively representative of a second state conformant with the deployment template at a second moment in time subsequent to implementing the transition. The instructions further include instructions that, when executed by the one or more computing processors, cause the one or more computing processors to determine, based on a comparison of the first enumeration and the second enumeration, a difference between the first state and the second state and generate a transition plan for transitioning from the first state to the second state. The transition plan can include, for example, a sequence of procedures for implementing the deployment template.

In some implementations of the system, the imperative portion specifies a trigger-based operation and the instructions further include instructions that, when executed by the one or more computing processors, cause the one or more computing processors to execute the trigger-based operation responsive to detecting a trigger-event for the trigger-based operation. Furthermore, in some implementations, the instructions further include instructions that, when executed by the one or more computing processors, cause the one or more computing processors to also execute the trigger-based operation during execution of the sequence of procedures.

In some implementations of the system, the instructions further include instructions that, when executed by the one or more computing processors, cause the one or more computing processors to generate an initial transition plan for transitioning from the first state to the second state, provide the initial transition plan to a client device, receive a modification instruction from the client device, generate a modified transition plan based on the initial transition plan and the received modification instruction, and use the modified transition plan as the transition plan for transitioning from the first state to the second state. In some implementations, the instructions further include instructions that, when executed by the one or more computing processors, cause the one or more computing processors to provide the initial transition plan to the client device as a script and receive the modification instruction as one of: edits to the script or a replacement script.

Some implementations of the system include instructions that, when executed by the one or more computing processors, cause the one or more computing processors to manage at least one resource by transmitting authenticated commands to a third-party computing cloud. Some implementations of the system include instructions that, when executed by the one or more computing processors, cause the one or more computing processors to execute the transition plan using commands authenticated on behalf of a user. Some implementations include instructions to execute the sequence of procedures included in the transition plan. In some implementations of the system, the deployment template specifies, for each of the plurality of resources, a respective resource type and configuration. In some such implementations, the system include instructions that, when executed by the one or more computing processors, cause the one or more computing processors to determine the one or more differences between the first state and the second state by identifying at least one of: a change in a number of resources of a first resource type or a change in a first resource configuration.

In some implementations of the system, the sequence of procedures for implementing the deployment template includes an ordered set of actions, with each action in the ordered set of actions designating a respective procedure to apply to a respective resource, and at least one action in the ordered set of actions designating a customized procedure overriding a default procedure for the respective resource. In some implementations of the system, the transition plan is stored in an acyclic-graph data structure such that each graph node represents an action and each directed graph vertex represents a sequence ordering. In some such implementations, the data structure is stored in the computer-readable memory. In some implementations, the data structure is stored in a separate memory, e.g., a network-accessible memory such as may be provided by a networked server or cloud-computing resource.

At least one aspect of the disclosure is directed to a computer-readable medium storing computer-executable instructions in a non-transitory form that, when executed by one or more computing processors, cause the one or more computing processors to receive a deployment template that includes a declarative portion specifying a plurality of resources to be deployed in one or more computing clouds, and an imperative portion specifying at least one customization overriding a default procedure for a resource. The default procedure can be, for example, one of: a procedure for adding the resource, a procedure for changing a configuration for the resource, or a procedure for terminating the resource. The customization can be, for example, a custom procedure differing from the default procedure. The instructions further include instructions that, when executed by the one or more computing processors, cause the one or more computing processors to generate a first enumeration of a set of resources deployed in the one or more computing clouds at a first moment in time prior to implementing a transition based on the deployment template, the first enumeration representative of a first state and generate a second enumeration of the plurality of resources described by the deployment template prospectively representative of a second state conformant with the deployment template at a second moment in time subsequent to implementing the transition. The instructions further include instructions that, when executed by the one or more computing processors, cause the one or more computing processors to determine, based on a comparison of the first enumeration and the second enumeration, a difference between the first state and the second state and generate a transition plan for transitioning from the first state to the second state. The transition plan can include, for example, a sequence of procedures for implementing the deployment template.

In some implementations of the computer-readable medium, the imperative portion specifies a trigger-based operation and the instructions further include instructions that, when executed by the one or more computing processors, cause the one or more computing processors to execute the trigger-based operation responsive to detecting a trigger-event for the trigger-based operation. Furthermore, in some implementations, the instructions further include instructions that, when executed by the one or more computing processors, cause the one or more computing processors to also execute the trigger-based operation during execution of the sequence of procedures.

In some implementations of the computer-readable medium, the instructions further include instructions that, when executed by the one or more computing processors, cause the one or more computing processors to generate an initial transition plan for transitioning from the first state to the second state, provide the initial transition plan to a client device, receive a modification instruction from the client device, generate a modified transition plan based on the initial transition plan and the received modification instruction, and use the modified transition plan as the transition plan for transitioning from the first state to the second state. In some implementations, the instructions further include instructions that, when executed by the one or more computing processors, cause the one or more computing processors to provide the initial transition plan to the client device as a script and receive the modification instruction as one of: edits to the script or a replacement script.

Some implementations of the computer-readable medium include instructions that, when executed by the one or more computing processors, cause the one or more computing processors to manage at least one resource by transmitting authenticated commands to a third-party computing cloud. Some implementations include instructions that, when executed by the one or more computing processors, cause the one or more computing processors to execute the transition plan using commands authenticated on behalf of a user. Some implementations include instructions to execute the sequence of procedures included in the transition plan. In some implementations of the computer-readable medium, the deployment template specifies, for each of the plurality of resources, a respective resource type and configuration. In some such implementations, the computer-readable medium includes instructions that, when executed by the one or more computing processors, cause the one or more computing processors to determine the one or more differences between the first state and the second state by identifying at least one of: a change in a number of resources of a first resource type or a change in a first resource configuration.

In some implementations of the computer-readable medium, the sequence of procedures for implementing the deployment template includes an ordered set of actions, with each action in the ordered set of actions designating a respective procedure to apply to a respective resource, and at least one action in the ordered set of actions designating a customized procedure overriding a default procedure for the respective resource. In some implementations, the transition plan is stored in an acyclic-graph data structure such that each graph node represents an action and each directed graph vertex represents a sequence ordering. In some such implementations, the data structure is stored in the computer-readable medium. In some implementations, the data structure is stored in a separate memory, e.g., a network-accessible memory such as may be provided by a networked server or cloud-computing resource.

BRIEF DESCRIPTION OF THE DRAWINGS

The above and related objects, features, and advantages of the present disclosure will be more fully understood by reference to the following detailed description, when taken in conjunction with the following figures, wherein.

The accompanying drawings are not intended to be drawn to scale. Like reference numbers and designations in the various drawings indicate like elements. For purposes of clarity, not every component may be labeled in every drawing.

DETAILED DESCRIPTION

In brief overview, a deployment template for resources used in a cloud-based application can describe, for example, a set of cloud resources, a set of operations, and a set of outputs as a sequence of declarations. Described herein are systems and methods that provision resources in one or more clouds based on a deployment template. In some implementations, the deployment template can be purely declarative, e.g., where the template simply specifies an end state, including a set of resources to be provisioned, their configuration, and their dependencies. For example, an external IP address may need to be established before a server can be provisioned with that external IP address. When provisioning such a deployment template, a provisioning system infers that it has to provision the external IP address first. However, in more complex scenarios, the steps to provision an application may be more difficult or impossible for the provisioning system to infer in a generic manner. For example, a multi-tier web stack may include application servers that can't be launched until after back-end servers, e.g., database servers, are fully operational. Meanwhile, while provisioning the multi-tier web stack, a load balancer might redirect traffic to a separate server hosting a placeholder web page, e.g., a "coming soon" page. Thus, in this example, the provisioning system manages the sequences of redirecting traffic to the placeholders, updating the back end database servers, instantiating new application servers, and redirecting traffic to the application servers. The example can be further complicated by introducing non-transformational steps like taking a back-up image of a resource. For example, a database snapshot does not result in a new database instantiation. In some implementations, a more complex deployment template is used that includes both declarative portions as well as imperative portions. The imperative portions allow a designer or deployment administrator the ability to specify how transitions should be managed. As described herein, the added complexity of the imperative portion requires a more complex cloud management system that can generate a transition plan for provisioning such a deployment template.

Figure 1:
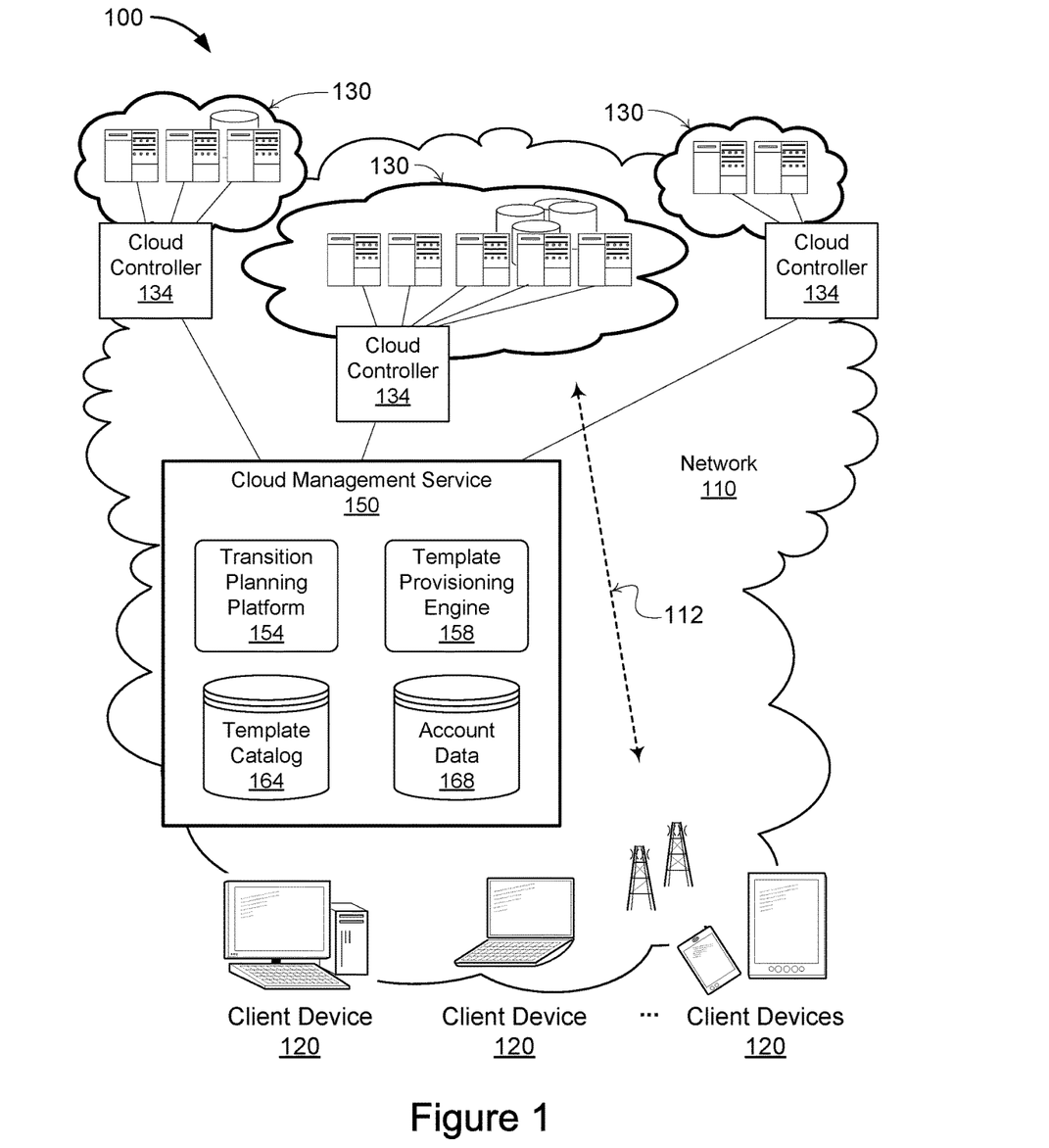
FIG. 1 is a block diagram illustrating an example network environment including a cloud management service.

FIG. 1 is a block diagram illustrating an example network environment 100 including a cloud management service 150. In broad overview, FIG. 1 includes a network 110 facilitating communication 112 between client devices 120 and computing clouds 130. Each computing cloud 130 is illustrated with a cloud controller 134. A cloud management service 150 interacts with the cloud controllers 134 to provision resources within the respective clouds 130. The cloud management service 150 includes a transition planning platform 154, a template provisioning engine 158, a template catalog 164, and account data storage 168. The illustrated cloud management service 150 is an example implementations and some implementations do not include every element illustrated. In some implementations, some illustrated elements are combined into single unified elements.

Figure 6:
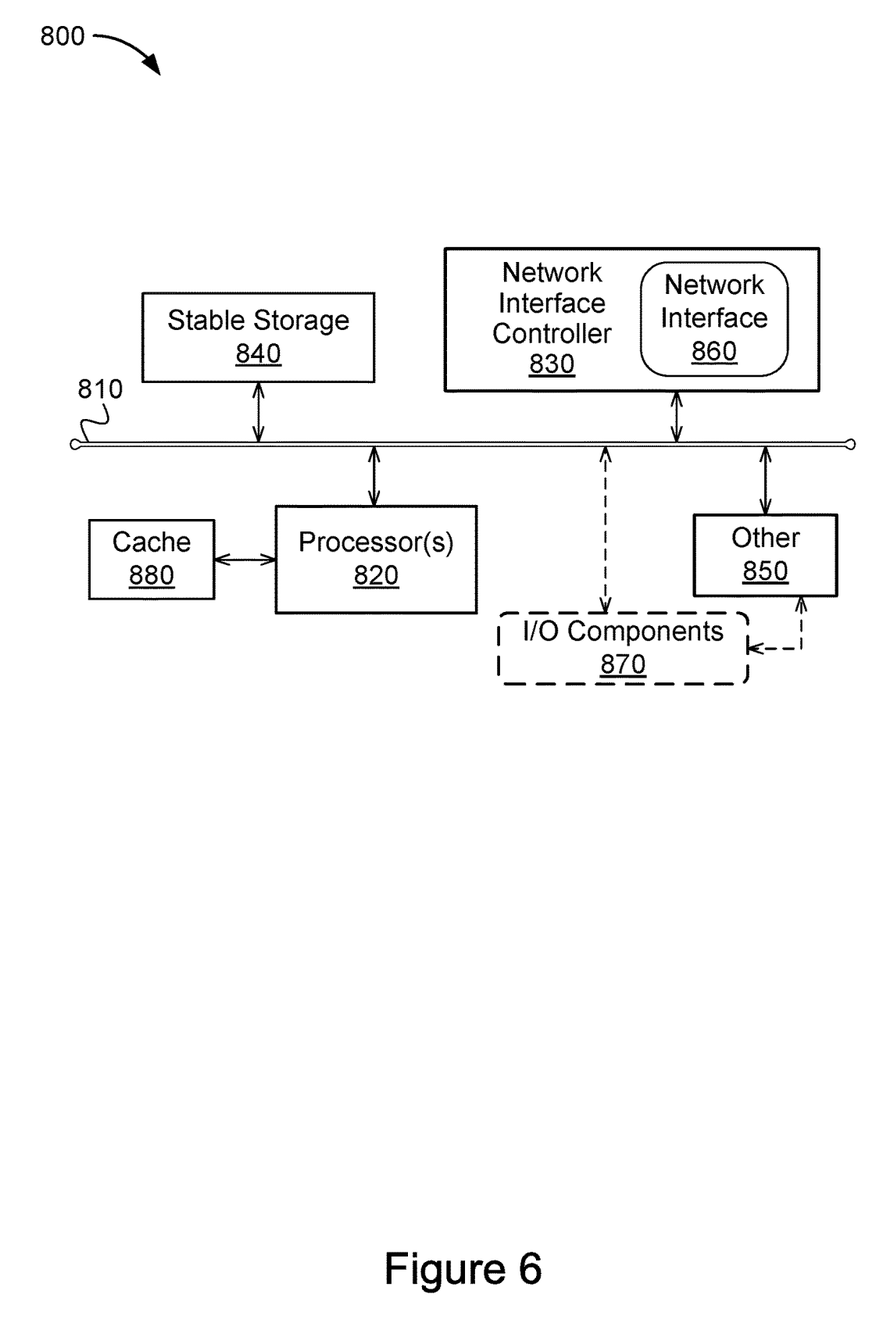
FIG. 6 is a block diagram of a computer device suitable for use in some implementations.

Referring to FIG. 1 in more detail, computing clouds 130 include any configuration of computing devices to provide cloud computing resources. For example, the National Institute of Standards and Technology ("NIST") defines a computing cloud as an infrastructure that enables "ubiquitous, convenient, on-demand network access to a shared pool of configurable computing resources (e.g., networks, servers, storage, applications, and services) that can be rapidly provisioned and released with minimal management effort or service provider interaction." (NIST Pub. 800-145 at page 3 (September 2011)). The NIST definition, however, is not limiting; accordingly, computing infrastructures may constitute a computing cloud without strict compliance to an NIST definition. One example of a computing cloud 130 is a multi-tenant cloud hosted by a third-party service provider such as, for example, Amazon.com, Inc. (e.g., Amazon Web Services), Rackspace Hosting, Inc. (e.g., Rackspace Cloud), Google Inc. (e.g. Google Compute Engine), or Microsoft Corp. (e.g., Windows Azure). In some implementations, the computing cloud 130 may be single-tenant and/or hosted within an organization or corporate entity that also provides the cloud management service 150. The computing clouds 130 may be private or public. The computing clouds 130 provide resources such as servers (physical or virtualized) and services that generally relate to, and interact with, the servers. For example, Amazon Elastic MapReduce (Amazon EMR) is a web service that enables Amazon's customers to process large amounts of data. "[EMR] utilizes a hosted Hadoop framework running on the web-scale infrastructure of Amazon Elastic Compute Cloud (Amazon EC2) and Amazon Simple Storage Service (Amazon S3)." (http://aws.amazon.com/elasticmapreduce/). In some implementations, the cloud management service 150 facilitates a deployment across multiple computing clouds 130. In such implementations, some of the participating computing clouds 130 may be private, while other participating computing clouds 130 may be public. Each participating computing cloud 130 may use its own authentication scheme for controlling provisioning and management of cloud-provided resources. For example, distinct credentials may be required for administration of each computing cloud 130. FIG. 6, described below, illustrates an example computing device 800 suitable for use as a server participating within the infrastructure of a computing cloud 130.

Each computing cloud 130 includes one or more cloud controllers 134. The cloud controller 134 is an administrative interface for provisioning, configuring, maintaining, and otherwise managing a respective computing cloud 130. For example, the cloud controller 134 may enable a customer of the cloud provider to instantiate and use one or more virtual servers in various different configurations matching the particular needs of the customer. The customer may configure, use, or manipulate these services and servers as needed. A customer may be an individual or an organization, e.g., a corporate entity. Host providers may characterize a customer as an account, such that the servers and services for a customer are scoped within a single account with one or more users authorized to access the account using a user-specific credential, e.g., using some combination of an email address, a user ID, an account ID, an account or user-specific password, and/or an encrypted or signed certificate. A user may provision, configure, or use the virtual servers and services hosted by the computing cloud 130, e.g., by issuing requests to the cloud controller 134. For example, the user may submit a request to a cloud controller 134 using a protocol such as HTTP or HTTPS. The cloud controller 134 authenticates the request based on the access credentials associated with the request. For example, in some instances, the request is accompanied by a credential or an authentication token. In some instances, the request is submitted during an authenticated session. In some implementations, cloud management service 150 provides the customer with a token or access entity credentials enabling the customer's client device 120 to communicate directly 112 with the cloud controller 134 or a service provisioned in a computing cloud 130. In some implementations, information for each user or customer account is stored by the cloud management service 150 in a library of account data 168. The library of account data 168 may include, for example, account description information, account identifiers such as a user name, a flag indicating whether the account is active or disabled, and a set of permissions, access rights, and/or credentials for use by the cloud management service 150 on behalf of the respective account in interactions with one or more cloud controllers 134.

The network 110 facilitates communication 112 between client devices 120 and computing clouds 130. Examples of communication networks include a local area network ("LAN"), a wide area network ("WAN"), an inter-network (e.g., the Internet), and peer-to-peer networks (e.g., ad hoc peer-to-peer networks). The network 110 may be composed of multiple connected sub-networks or autonomous networks. The network 110 can be a corporate intranet, a metropolitan area network (MAN), or a virtualized network. In some implementations, the network 110, or portions of the network 110, adheres to the multi-layer Open System Interconnection ("OSI") networking framework ("OSI Model"). Any type and/or form of data network and/or communication network can be used for the network 110. It can be public, private, or a combination of public and private networks. In general, the network 110 is used to convey information between computing devices.

Client devices 120 include, but are not limited to, computing devices used by consumers of the functionality provided by the computing clouds 130. The client devices 120 interact 112 with the computing clouds 130. An end-user may, for example, access a web page hosted by a cloud server, store data at a cloud-based storage, or benefit from infrastructure provided by a computing cloud 130. In some implementations, a user of a client device 120 may interact with a cloud controller 134 to establish or modify a resource deployment hosted by a computing cloud 130. In some implementations, a user of a client device 120 may interact with the cloud management service 150 to establish or modify a resource deployment hosted by a computing cloud 130. In some implementations, a user of a client device 120 may interact with the cloud management service 150 to design, publish, and/or provision a deployment template. FIG. 6, described below, illustrates an example computing device 800 suitable for use as a client device 120.

In some implementations, users interact with the cloud management service 150 as an intermediary between the user and the cloud controllers 134 for the respective computing clouds 130. In some implementations, the cloud management service 150 presents an API (Application Programming Interface) via the network 110 to a client device 120. In some implementations, the interface presented by the cloud management service 150 is a web interface or website. In some implementations, the client device 120 executes software configured to communicate with the cloud management service 150.

Generally, the cloud management service 150 is capable of interacting with a cloud controller 134 for a computing cloud 130 to provision and manage cloud-based resources, e.g., to instantiate cloud-based services and virtual servers hosted by a computing cloud 130. The interaction may be in the form of a request from the cloud management service 150 to a cloud controller 134 or to a service operated within a computing cloud 130. The interaction may be in the form of steps performed by the cloud management service 150. In some implementations, the cloud management service 150 is further capable of modifying an instantiated cloud-based service or virtual server, e.g., pausing a service or updating a virtual server. In some implementations, the cloud management service 150 converts between a standardized instruction set and instruction sets tailored to each computing cloud 130.

Figure 2:
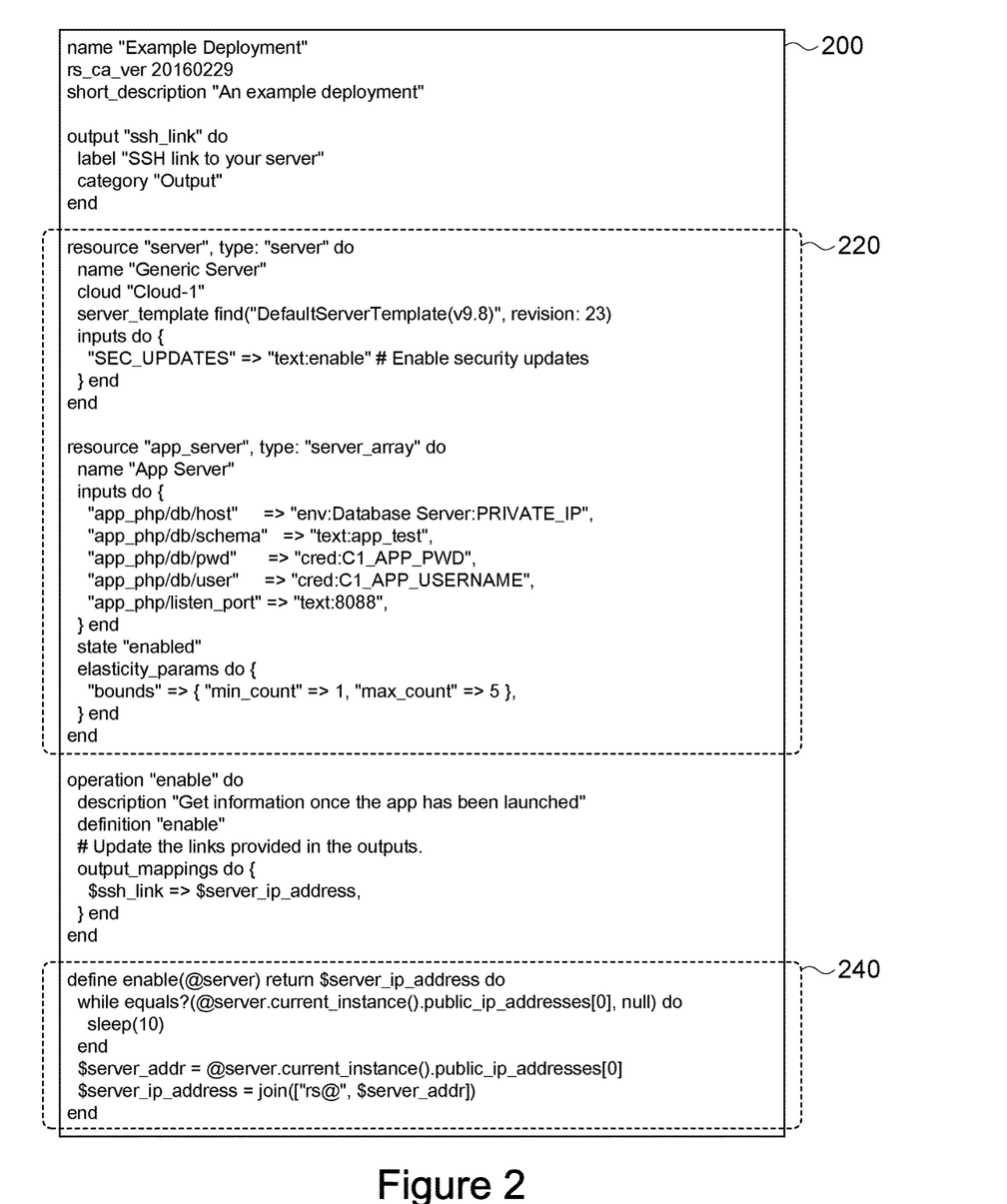
FIG. 2 is a block diagram illustrating an example deployment template.

The cloud management service 150 includes a template catalog 164, storing generic and custom deployment templates. In some implementations, the cloud management service 150 uses deployment templates to describe what resources should be deployed at the computing clouds 130 and how the deployment should be provisioned. In some instances, a deployment template specifies one or more relationships between resources. For example, a deployment template can specify a resource, e.g., an HTTP host, with dependencies on additional resources, e.g., a dependency on a back-end data server. The deployment template may specify one or more cloud computing host providers, parameters for selecting one or more cloud computing host providers, or conditional logic for identifying one or more cloud computing host providers. In some implementations, the deployment template includes instructions for configuring resources. In some implementations, the deployment template includes instructions for sequencing instantiation of resources. In some implementations, the deployment template includes conditional instructions. The deployment template can include a declarative portion and an imperative portion. An example pseudo-code deployment template is shown in FIG. 2, described below.

The cloud management service 150 includes a transition planning platform 154. Administrators can use the transition planning platform 154 to create a transition plan for provisioning a deployment template, e.g., a deployment template stored in the template catalog 164. In some implementations, the transition planning platform 154 provides an interface for creating an initial transition plan and making changes to the initial transition plan to create a modified transition plan. In some implementations, the interface provided by the transition planning platform 154 facilitates revisions to the modified transition plan. In some implementations, the interface provided by the transition planning platform 154 tests and models implementation of the modified transition plan.

The cloud management service 150 includes a template provisioning engine 158 for use in launching, using, executing, activating, or otherwise provisioning a template from the template catalog 164. In some implementations, the template provisioning provides an interface, e.g., an API, a web interface, or a custom utility, for use by a user of a client device 120, through which the user can request provisioning of a template. In some implementations, the template provisioning engine 158 uses a transition plan created or generated by the transition planning platform 154. In some implementations, the template provisioning engine 158 generates and sends a request to the transition planning platform 154 requesting a transition plan for provisioning a particular deployment template, e.g., a deployment template in the catalog 164.

The template catalog 164 and library of account data 168 may each be implemented using one or more data storage devices. The data storage devices may be any memory device suitable for storing computer readable data. The data storage devices may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or BLU-RAY® discs). Example implementations of suitable data storage devices include storage area networks ("SAN"), network attached storage ("NAS"), and redundant storage arrays. Data for the template catalog 164 and/or the library of account data 168 may be recorded as data files in a file system or as data in a knowledge base, object database, relational database, or other data organizing structure. In some implementations, all or portions of the data is recorded in an encrypted form.

As described in detail herein, cloud computing resources can be provisioned based on a deployment template. Provisioning the deployment template can include establishing or creating resources in one or more computing clouds, configuring resources in the one or more computing clouds, launching applications in the computing one or more computing clouds, and any other tasks detailed by the template. Generally, the deployment template includes statements that describe a prospective end-state, i.e., what the deployment should look like when fully provisioned. These statements may, for example, declare what resources are to be deployed or what capabilities are to be enabled. A portion of the template composed of these declarations is referred to as a declarative portion. The deployment template may also include imperative statements describing how to achieve the prospective end-state, e.g., using conditional logic or other imperative means. A portion of the template composed of these imperative statements is referred to as an imperative portion. In general, a template provisioning engine uses default procedures for deploying the resources or enabling the capabilities specified in the declarative portion. However, in some deployment templates, the imperative portion may specify one or more customizations that override these default procedures. For example, the default procedure may be a default procedure for adding a resource and the customization may provide an alternative procedure for adding the resource. Other examples of default procedures are procedures for changing the configuration for a resource or terminating a resource.

In some instances, an administrator will want to convert a set of cloud computing resources from one state (a first deployment) to another state (a second deployment) using a deployment template. The deployment template may describe how to provision the second deployment from scratch, but not address this sort of conversion. Accordingly, described herein are systems and methods for facilitating conversion from a first deployment state to another state described by a deployment template.

FIG. 2 is a block diagram illustrating an example deployment template 200. The illustration includes pseudo-code for a declarative portion 220 specifying one or more resources to be deployed in one or more computing clouds and an imperative portion 240 specifying operations for adding, reconfiguring, changing, terminating, or otherwise altering a resource. In some implementations, the imperative portion 240 specifies operations specific to how a resource declared in the declarative portion 220 is to be deployed or configured. In some implementations, the imperative portion 240 imposes an ordering or sequence of operations for provisioning the deployment. In some implementations, the imperative portion 240 specifies one or more customizations overriding respective default procedures for one or more resources. The customizations can be, for example, procedures that specify how a particular resource is to be handled during provisioning. In some implementations, the declarative portion 220 relies, in part, on default procedures such as default procedures for adding a resource, changing a configuration for a resource, or terminating a resource. In some implementations, the imperative portion 240 specifies a customization overriding such a default procedure. In some implementations, the procedures may be parameterized and the imperative portion 240 may include specification of parameters. For example, parameters may be used in specifying how a resource should be configured.

The deployment template 200 illustrated in FIG. 2 is not comprehensive; a full deployment template may be hundreds or thousands of lines of instructions. The illustrated deployment template 200 is provided merely as an example and is not to be considered limiting.

Figure 3:
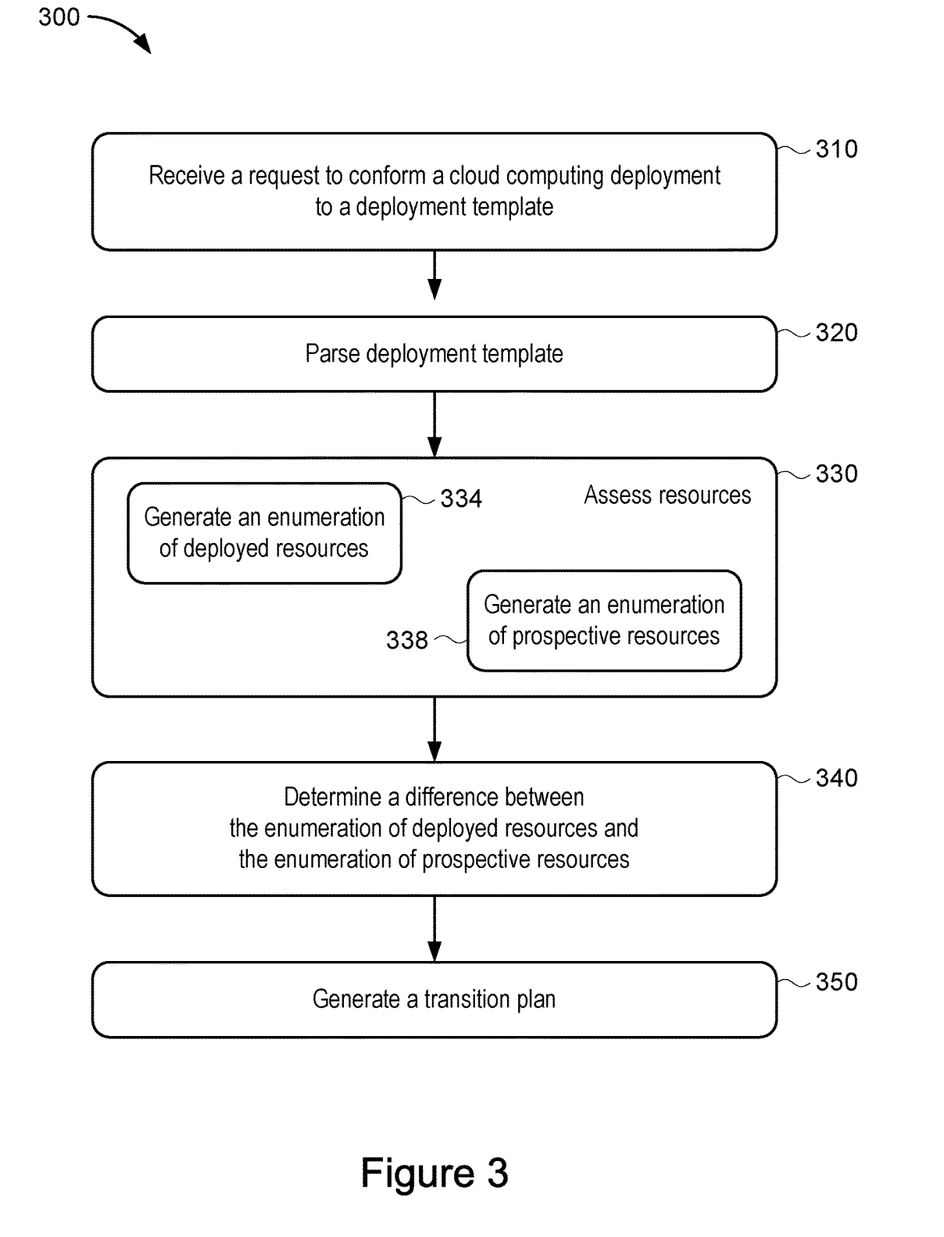
FIG. 3 is a flowchart for an example method of processing a deployment template.

FIG. 3 is a flowchart for an example method 300 of processing a deployment template. In a broad overview of the method 300, the cloud management service 150 receives a request to conform a cloud computing deployment to a deployment template (stage 310). Responsive to this request, the cloud management service 150 parses the deployment template (stage 320) and assess the resource requirements (stage 330). Assessing the resource requirements includes generating an enumeration of deployed resources (stage 334) and generating an enumeration of prospective resources based on the deployment template (stage 338). The cloud management service 150 then determines a difference between the enumeration of deployed resources and the enumeration of prospective resources (stage 340) and generates a transition plan for achieving a deployment conforming to the deployment template (stage 350).

Referring to FIG. 3 in more detail, the method 300 may begin with the cloud management service 150 receiving a request to conform a cloud computing deployment to a deployment template (stage 310). In some implementations, the cloud management service 150 receives a request that identifies a template from a catalogue or template library. In some implementations, the cloud management service 150 receives a request that include a template inline within the request. In some implementations, the request is the template itself. The cloud management service 150 then processes the request and parses the template (stage 320), identifying the various resources that the deployment will require.

The cloud management service 150 parses the deployment template (stage 320). In some implementations, the cloud management service 150 parses the deployment template by executing a template processing system distinct from the cloud management service 150. In some implementations, parsing the deployment template includes modeling the deployment template, e.g., modeling one or more cloud deployments satisfying the deployment template. The cloud management service 150 identifying the various resources that the deployment will require based on the parsed deployment template.

Responsive to the received request, the cloud management service 150 assess the resources (stage 330), which includes generating an enumeration of deployed resources (stage 334), i.e., resources deployed prior to provisioning the deployment, and generating an enumeration of prospective resources based on the deployment template (stage 338), i.e., the resources that will exist deployed after provisioning the deployment. The enumerations (stages 334 and 338) may occur concurrently or in either order.

The cloud management service 150 generates an enumeration of deployed resources (stage 334). In some implementations, the enumeration of deployed resources is an enumeration of a set of resources deployed in one or more computing clouds at a specific moment in time prior to implementing a transition based on the deployment template. That is, the enumeration of deployed resources is representative of a first state, prior to provisioning the received deployment template. In some implementations, this enumeration of deployed resources is a snapshot. In some implementations, deployed resources are not static; that is, instantiations of some resources may be launched and terminated according to a schedule or responsive to an event. For example, extra client-facing servers may be needed during peak client-demand periods. Accordingly, in some implementations the enumeration of the deployed resources is a snapshot of the deployed resources at a particular time period. In some implementations, the enumeration of the deployed resources includes indications of resource variability, e.g., including peak and non-peak counts such as the maximum and minimum number of a particular resource deployed within a predetermined window of time. In some implementations, the enumeration of the deployed resources is an enumeration of the minimum static deployment, ignoring resources instances that are merely temporary. In some implementations, the enumeration of the deployed resources is an enumeration of the maximum possible deployment, and includes all resource instances including those that are merely temporary. In some instances, the deployment template is for an initial deployment, where there are no deployed resources to enumerate. In some instances, the deployment template is used to transition from a first deployment to a second deployment, where there are deployed resources. During provisioning, some of these deployed resources may be terminated, reconfigured, or left untouched.

The cloud management service 150 also generates an enumeration of prospective resources (stage 338). While the enumeration of deployed resources represents a view of the deployment prior to provisioning, the enumeration of prospective resources described by the deployment template is representative of a second state conformant with the deployment template at a second moment in time subsequent to provisioning. This second enumeration is forward-looking and represents an understanding of what the deployment will look like after completion of a transition plan to effect the deployment template. In some implementations, the cloud management service 150 generates the enumeration of prospective resources by modeling deployment of the deployment template and identifying the resources instantiated in the model deployment. In some implementations, the model is a simulation, e.g., a virtualized deployment. In some implementations, the cloud management service 150 generates the enumeration of prospective resources by analysis of the deployment template. In some implementations, the cloud management service 150 generates the enumeration of prospective resources by analysis of the declarative portions of the deployment template followed by analysis of the imperative portions of the deployment template.

The cloud management service 150 then determines any differences between the enumeration 334 of the deployed resources and the enumeration 338 of prospective resources (stage 340). In some implementations, the cloud management service 150 compares the enumerations and identifies resources that are present in one enumeration but not the other. In some implementations, the cloud management service 150 identifies resources in the enumeration of deployed resources 334 that are reconfigured and present, in a reconfigured state, in the enumeration of prospective resources 338. In some implementations, the cloud management service 150 identifies resources that are added into, or missing from, the enumeration of prospective resources 338, as compared to the enumeration 334 of the deployed resources. In some implementations, the deployment template specifies, for each of the resources in a resulting deployment, a respective resource type and configuration. In some such implementations, determining differences between the enumeration 334 of the deployed resources and the enumeration 338 of prospective resources includes identifying a change in a number of resources of a particular resource type and/or a change in a particular resource configuration. In some implementations, the cloud management service 150 represents the determined differences as a list of new resources, updated resources, and deleted resources. In some such implementations, the list includes configuration field values for the new and updated resources.

The cloud management service 150 generates a transition plan based on the determined differences determines between the enumeration of the deployed resources from stage 320 and the enumeration of prospective resources from stage 330 (stage 350). Resources that exist in the enumeration of the deployed resources, but not in the enumeration of prospective resources, may need to be terminated or converted into a resource that is present in the enumeration of prospective resources. When a resource needs to be terminated, the cloud management service 150 identifies an orderly shutdown procedure for terminating the resource. Likewise, when a resource exists in the enumeration of prospective resources, but not in the enumeration of deployed resources, the cloud management service 150 identifies a provisioning procedure for establishing or provisioning the resource. Finally, if a resource exists in both enumerations, the cloud management service 150 determines if both instance can be satisfied by the same resource or if the resource needs to be reconfigured or otherwise modified.

In addition, the deployment template can include both declarative and imperative statements. The transition plan generated in stage 350 effects provisioning of a deployment consistent with, or conforming to, the declarative statements in the deployment template. In some implementations, the transition plan also incorporates the imperatives from the deployment template such that provisioning is achieved in the manner defined by the imperative statements. For example, if an imperative statement includes logical provisioning sequencing, then the cloud management service 150 generates the transition plan to accommodate the sequencing. Likewise, if an imperative statement includes conditional logic, then the cloud management service 150 generates the transition plan to implement the conditional logic.

In some implementations, the transition plan is stored in an acyclic-graph data structure such that each graph node represents an action and each directed graph vertex represents a sequence ordering. For example, the acyclic-graph data may be stored in a persistent format, e.g., in a file, in a set of files, or as entries in a database. Each node of the acyclic-graph data corresponds to one or more particular actions to be taken. When the actions for a given node are complete, a provisioning engine (e.g., template provisioning engine 158) proceeds along a vertex to a next node as specified by the acyclic-graph data.

In some implementations, the transition plan generated at 350 may be further modified by a second process, e.g., a deployment simulation, or provided to an administrative interface for confirmation and/or revision. In some implementations, the cloud management service 150 provides the transition plan to a client device 120, e.g., as a script, and receives feedback from the client device 120 for modifying the transition plan, e.g., as instructions for modifying the transition plan, as modifications to the script, or as a replacement script.

In some implementations, the cloud management service 150 then executes the transition plan, e.g., executing a sequence of instructions or procedures included in the transition plan. In some implementations, one or more of the instructions or procedures requires transmitting commands to a third-party computing cloud 130, e.g., to a cloud controller 134. In some implementations, the commands to the third-party computing cloud 130 are authenticated on behalf of a user, e.g., an administrator or cloud-services account holder. In some implementations, the cloud management service 150 repeats the method 300 to confirm that the resulting deployment satisfies the deployment template. In some instances, e.g., because resource instances can be variable and/or because some resources might not be instantiated absent prerequisite conditions, multiple iterations may be necessary to complete a transition to a new deployment state that fully satisfies the deployment template. In some implementations, when no differences are identified at stage 340, the transition is complete.

Figure 4:
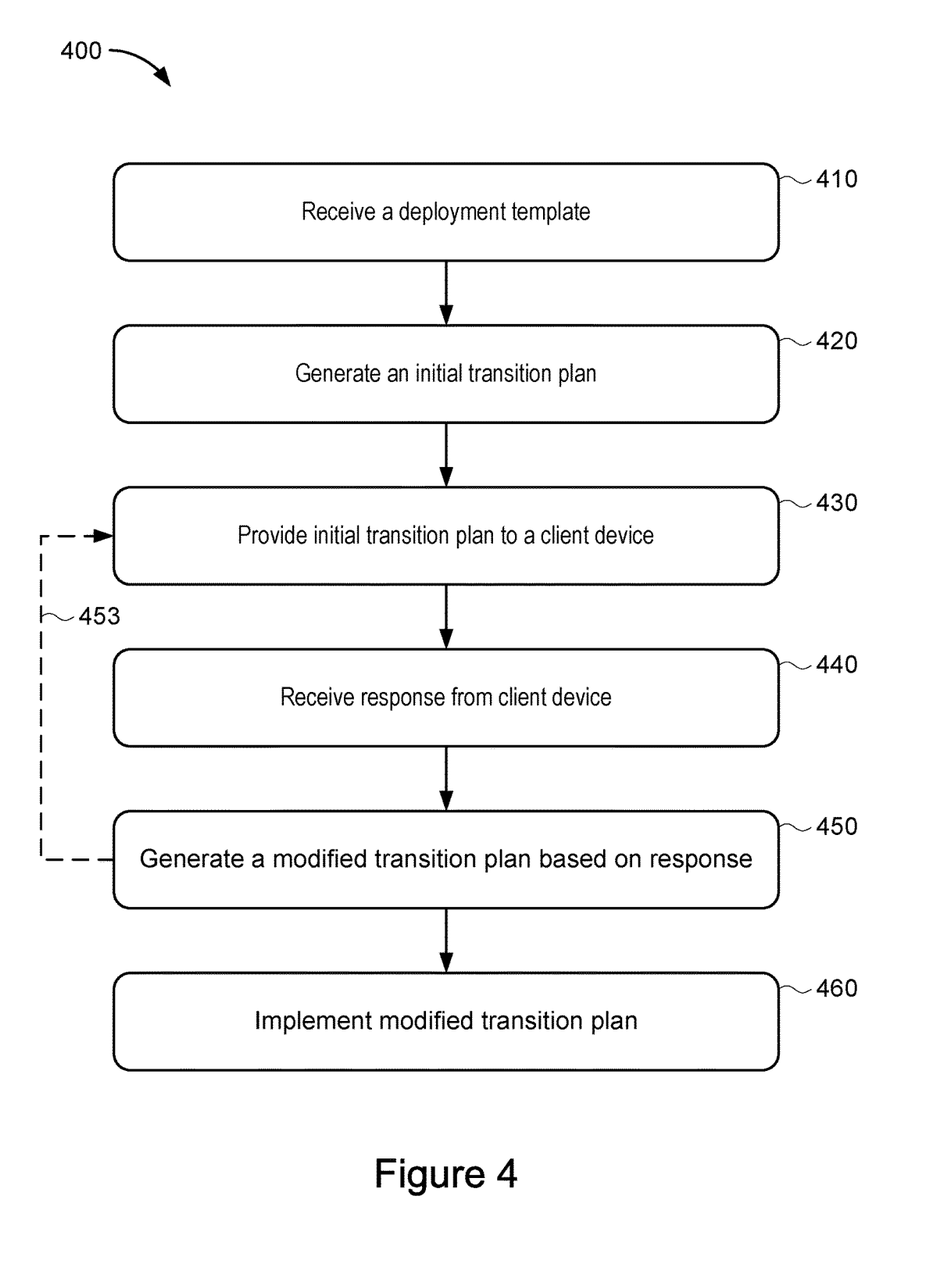
FIG. 4 is a flowchart for an example method of incorporating user modifications into a transition plan.

FIG. 4 is a flowchart for an example method 400 of incorporating user modifications into a transition plan. In a broad overview of the method 400, the cloud management service 150 receives a deployment template, or an identification of a deployment template (stage 410). The cloud management service 150 generates an initial transition plan for achieving a deployment conforming to the deployment template, e.g., using the method 300 described above (stage 420). The cloud management service 150 then provides the initial transition plan to a client device (stage 430) and receives a response from the client device (stage 440). The response contains modifications or other feedback for the initial transition plan. Accordingly, the cloud management service 150 then generates a modified transition plan based on the response (stage 450). In some implementations, the modified transition plan is provided to the client for further feedback, essentially repeating stages 430 through 450. The cloud management service 150 then implements the resulting modified transition plan (stage 460).

Referring to FIG. 4 in more detail, the method 400 may begin with the cloud management service 150 receiving a deployment template, or an identification of a deployment template (stage 410), and generating an initial transition plan for achieving a deployment conforming to the deployment template, e.g., using the method 300 described above (stage 420). That is, in some implementations, stage 410 is comparable to stage 310 shown in FIG. 3, and stage 420 is comparable to stage 350 shown in FIG. 3. In some implementations, the cloud management service 150 generates an initial transition plan at stage 420 for achieving a deployment conforming to the deployment template received or identified at stage 410. In some implementations, the deployment template received or identified at stage 410 is a generalized template, e.g., selected from a catalogue or library of deployment templates. In some such implementations, the cloud management service 150 identifies a corresponding pre-written transition plan based on the generalized template. In some such implementations, the cloud management service 150 modifies the pre-written transition plan, e.g., filling in identifiers for specific users, user accounts, third-party cloud hosts, and accounts for accessing the third-party cloud hosts.

Still referring to FIG. 4, the cloud management service 150 provides the initial transition plan to a client device (stage 430) and receives a response from the client device (stage 440). In some implementations, the cloud management service 150 provides the initial transition plan generated at stage 420 to a client device 120, as shown in FIG. 1. In some implementations, the client device includes a client interface, e.g., a web browser, a custom application, a graphical user interface ("GUI"), a command line interface, or any other type of interface. In some implementations, the interface is provided by the cloud management service 150. The interface may be used, at the client device, to modify or edit the transition plan. In some implementations, the cloud management service 150 provides the initial transition plan to the client device 120, and receives edits or modifications to the transition plan from the client device as an exchange of transition plan data. In some implementations, the cloud management service 150 and the client device 120 exchange transition plan data via an application layer (i.e., Open Systems Interconnection "OSI" layer 7) protocol such as Hypertext Transfer Protocol ("HTTP," used for delivering Web pages), Simple Mail Transfer Protocol ("SMTP," used for delivering e-mail), or File Transfer Protocol ("FTP," used for direct file transfer). In some implementations, the cloud management service 150 and the client device 120 exchange initial transition plan data via a presentation layer (i.e., "OSI" layer 6) protocol. In some implementations, the cloud management service 150 provides the initial transition plan to the client device 120 via a custom protocol, e.g., built on an OSI layer-4 transport protocol such as User Datagram Protocol ("UDP"), Transmission Control Protocol ("TCP"), or Stream Control Transmission Protocol ("SCTP").

The cloud management service 150 receives a response from the client device (stage 440). The client device 120 provides the response to the cloud management service 150, e.g., via a network transmission or instruction. In some implementations, the response includes feedback to the cloud management service 150 regarding the transition plan, e.g., affirmation or acceptance of the transition plan provided. In some implementations, the response includes instructions for modifying the transition plan at the cloud management service 150. In some implementations, the response includes modifications to replace all or portions of the initial transition plan. In some implementations, the response includes a modified transition plan.

The cloud management service 150 then generates a modified transition plan based on the response received from the client device 120 (stage 450). In some implementations, the cloud management service 150 generates the modified transition plan as a comprehensive modified transition plan including portions of the initial transition plan and modified portions received from the client device in stage 440. In some implementations, the cloud management service 150 receives a complete transition plan from the client device 120 and generating the modified transition plan is simply a matter of replacing the initial transition plan with the received modified transition plan. In some implementations, the cloud management service 150 analyses the modified transition plan for errors, e.g., verifying that the modifications received from the client device 120 do not contain invalid instructions or create a security flaw. In some implementations, the modified transition plan is provided to the client device 120 for further feedback, essentially repeating stages 430 through 450 (shown as arrow 453). The cloud management service 150 then implements the resulting modified transition plan (stage 460).

The cloud management service 150 implements the modified transition plan (stage 460). In some implementations, the cloud management service 150 invokes sub-processes for one or more steps indicated in the modified transition plan. In some implementations, the transition plan includes a sequence of procedures for implementing the deployment template, including an ordered set of actions. Each action in the ordered set of actions designates a respective procedure to apply to a respective resource. In some such implementations, an action in the ordered set of actions designates a customized procedure overriding a default procedure for a particular resource. In some implementations, the transition plan is a script, e.g., a Python script, and the cloud management service 150 passes the transition plan to a script execution environment. In some implementations, the cloud management service 150 compiles the modified transition plan. In some implementations, the cloud management service 150 executes the modified transition plan or the compiled modified transition plan. In some implementations, the transition plan may include custom event-triggered operations.

Figure 5:
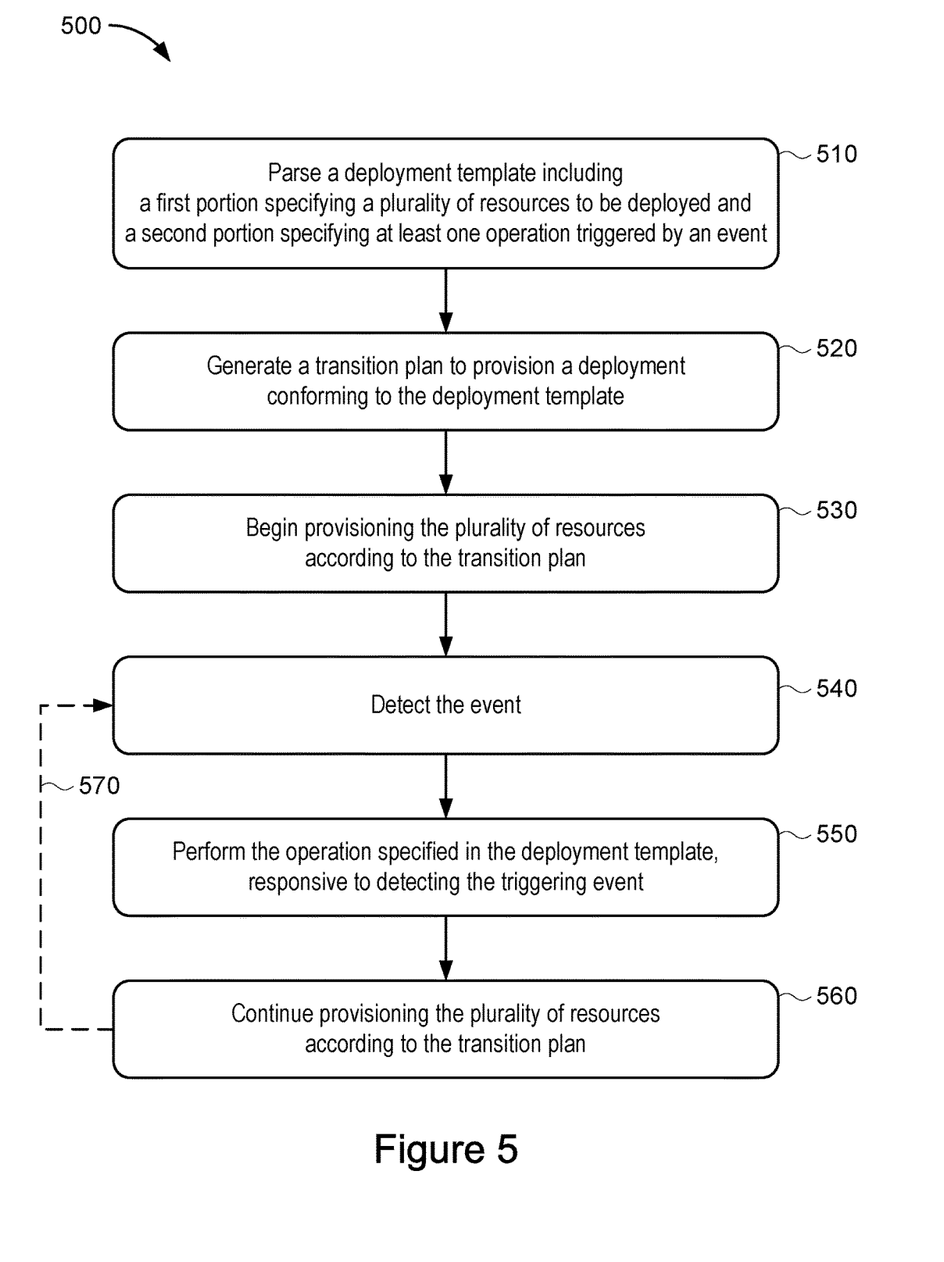
FIG. 5 is a flowchart for an example method of executing a transition plan with custom event-triggered operations.

FIG. 5 is a flowchart for an example method 500 of executing a transition plan with custom event-triggered operations. In a broad overview of the method 500, the cloud management service 150 parses a deployment template that includes a first portion specifying a plurality of resources to be deployed and a second portion specifying at least one operation triggered by an event (stage 510). The cloud management service 150 generates a transition plan to provision a deployment conforming to the deployment template (stage 520). For example, the cloud management service 150 may use the methods 300 and/or 400 described above. The cloud management service 150 begins provisioning the plurality of resources in accordance with the transition plan (stage 530) until it detects an event associated with a specified event-triggered operation (stage 540). The cloud management service 150 then performs the operation specified in the deployment template, responsive to detecting the triggering event (stage 550). The cloud management service 150 continues provisioning the plurality of resources according to the transition plan (stage 560) and may, optionally, detect additional events (illustrated by arrow 570 back to stage 540).

Referring to FIG. 5 in more detail, the method 500 may begin with the cloud management service 150 parsing a deployment template that includes a first portion specifying a plurality of resources to be deployed and a second portion specifying at least one operation triggered by an event (stage 510). In some implementations, the deployment template is received or identified in a request to provision the deployment. In some implementations, the cloud management service 150 parses the template in the manner described above in stage 320 illustrated in FIG. 3. In some implementations, the cloud management service 150 executes a template processing system to parse the deployment template, where the template processing system is distinct from the cloud management service 150. In some implementations, parsing the deployment template includes modeling the deployment template, e.g., modeling one or more cloud deployments satisfying the deployment template.

The cloud management service 150 then generates a transition plan to provision a deployment conforming to the deployment template (stage 520). In some implementations, the cloud management service 150 generates the transition plan using the method 300 described above and illustrated in FIG. 3. In some implementations, the cloud management service 150 generates the transition plan with user feedback using the method 400 described above and illustrated in FIG. 4. The generated transition plan includes one or more operations triggered by an event. For example, in some implementations, the transition plan includes conditional logic to be executed if or when a condition occurs. In some implementations, the transition plan includes conditional logic to be executed if or when a condition occurs. For example, in some implementations, the condition is the occurrence of an event.

FIG. 6 is a block diagram of an example computing system 800 suitable for implementing the computing systems described herein, in accordance with one or more illustrative implementations. In broad overview, the computing system 800 includes at least one processor 820 for performing actions in accordance with instructions and one or more memory devices, such as stable storage 840 or cache 880, for storing instructions and data. The illustrated example computing system 800 includes one or more processors 820 in communication, via a bus 810, with stable storage 840, at least one network interface controller 830 with network interface port 860 for connection to a network (not shown), and other components 850, e.g., input/output ("I/O") components 870. Generally, the processor(s) 820 will execute instructions received from memory. The processor(s) 820 illustrated incorporate, or are directly connected to, cache memory 880. In some instances, instructions are read from stable storage 840 into cache memory 880 and executed by the processor(s) 820 from cache memory 880.

In more detail, the processor(s) 820 may be any logic circuitry that processes instructions, e.g., instructions fetched from the stable storage 840 or cache 880. In many implementations, the processor(s) 820 are microprocessor units or special purpose processors. The computing device 800 may be based on any processor, or set of processors, capable of operating as described herein. The processor(s) 820 may be single core or multi-core processor(s). The processor(s) 820 may be multiple distinct processors.

In some implementations, the computing device 800 controls the processor 820 through one or more abstraction layers. The processor 820 operates responsive to a set of instructions, e.g., machine code. The computing device 800 may include memory (e.g., a ROM) storing a firmware operating system such as BIOS. The firmware operating system, upon start-up, may initialize a software operating system responsible for controlling a flow of software instructions to the processor 820. The software operating system, and software embodied by the flow of instructions, can be run from a bootable medium, such as the stable storage 840, a bootable disc, or a USB device, or even via the network interface 860.

The stable storage 840 may be any memory device suitable for storing computer readable data. The stable storage 840 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 800 may have any number of stable storage devices 840.

The cache memory 880 is generally a form of computer memory placed in close proximity to the processor(s) 820 for fast read times. In some implementations, the cache memory 880 is part of, or on the same chip as, the processor(s) 820. In some implementations, there are multiple levels of cache 880, e.g., L2 and L3 cache layers.

The network interface controller 830 manages data exchanges via the network interface 860 (sometimes referred to as network interface ports). The network interface controller 830 handles the physical and data link layers of the OSI model for network communication. In some implementations, some of the network interface controller's tasks are handled by one or more of the processor(s) 820. In some implementations, the network interface controller 830 is part of a processor 820. In some implementations, a computing system 800 has multiple network interfaces 860 controlled by a single controller 830. In some implementations, a computing system 800 has multiple network interface controllers 830. In some implementations, each network interface 860 is a connection point for a physical network link (e.g., a cat-5 Ethernet link). In some implementations, the network interface controller 830 supports wireless network connections and an interface port 860 is a wireless (e.g., radio) receiver/transmitter (e.g., for any of the IEEE 802.11 protocols, near field communication ("NFC"), Bluetooth, adaptive network technology ("ANT"), or any other wireless protocol). In some implementations, the network interface controller 830 implements one or more network protocols such as Ethernet. Generally, a computing device 800 exchanges data with other computing devices via physical or wireless links through a network interface 860. The network interface 860 may link directly to another device or to another device via an intermediary device, e.g., a network device such as a hub, a bridge, a switch, or a router, connecting the computing device 800 to a data network such as the Internet.

The computing system 800 may include, or provide interfaces for, one or more input or output ("I/O") devices. Input devices include, without limitation, keyboards, microphones, touch screens, foot pedals, sensors, Musical Instrument Digital Interface ("MDI") devices, and pointing devices such as a mouse, trackball, or trackpad. Output devices include, without limitation, video displays, speakers, refreshable Braille terminal, lights, MIDI devices, and 2-D or 3-D printers.

The other components 850 may include an I/O interface, external serial device ports, and any additional co-processors. For example, a computing system 800 may include an interface (e.g., a universal serial bus ("USB") interface) for connecting input devices, output devices, or additional memory devices (e.g., portable flash drive or external media drive). In some implementations, a computing device 800 includes an additional device 850 such as a co-processor, e.g., a math co-processor can assist the processor 820 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them.

Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple optical discs, magnetic disks, or other storage devices). The computer storage medium may be tangible rather than a transitory signal, i.e., non-transitory.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an field programmable gate array ("FPGA") or an application specific integrated circuit ("ASIC"). Such a special purpose circuit may be referred to as a computer processor even if it is not a general-purpose processor. Multiple processors, or a multi-core processor, may be referred to in the singular, as a processor, e.g., when working in concert.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single circuit or software product, or packaged into multiple circuits or software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. A method comprising:
   receiving, by a deployment management system comprising at least one computer processor, a deployment template comprising:
   (i) a declarative portion specifying a plurality of resources to be deployed in one or more computing clouds, the declarative portion including conditional logic for identifying at least one of the computing clouds and instructions for sequencing instantiation of the resources,
   (ii) an imperative portion specifying at least one customization overriding a default procedure for a resource, wherein the default procedure is one of: adding the resource, changing a configuration for the resource, or terminating the resource, the default procedure being included in the declarative portion,
   wherein the deployment template is selected, by a user, from a plurality of deployment templates, the selected deployment template comprising the declarative portion and the imperative portion being specified by the user for inclusion in the deployment template;
   generating, via modeling the deployment template, a first enumeration of a set of resources deployed in the one or more computing clouds at a first moment in time prior to implementing a transition based on the deployment template, the first enumeration representative of a first state;
   generating a second enumeration of the plurality of resources described by the deployment template prospectively representative of a second state conformant with the deployment template at a second moment in time subsequent to implementing the transition;
   determining, based on a comparison of the first enumeration and the second enumeration, a difference between the first state and the second state; and
   generating, by the deployment management system, a transition plan for transitioning from the first state to the second state, the transition plan comprising a sequence of procedures for implementing the deployment template, and the sequence of procedures being stored as respective directed graph vertices of a data structure.

2. The method of claim 1, the imperative portion further specifying a trigger-based operation, the method further comprising executing the trigger-based operation responsive to detecting a trigger-event for the trigger-based operation.

3. The method of claim 2, the method further comprising executing the trigger-based operation during execution of the sequence of procedures.

4. The method of claim 1, comprising:
generating an initial transition plan for transitioning from the first state to the second state;
providing the initial transition plan to a client device;
receiving a modification instruction from the client device;
generating a modified transition plan based on the initial transition plan and the received modification instruction; and
using the modified transition plan as the transition plan for transitioning from the first state to the second state.

5. The method of claim 4, comprising:
providing the initial transition plan to the client device as a script; and
receiving the modification instruction as one of: edits to the script or a replacement script.

6. The method of claim 1, comprising managing at least one resource by transmitting authenticated commands to a third-party computing cloud.

7. The method of claim 1, comprising executing the transition plan using commands authenticated on behalf of a user.

8. The method of claim 1 comprising executing the sequence of procedures included in the transition plan.

9. The method of claim 1, wherein the deployment template specifies, for each of the plurality of resources, a respective resource type and configuration, the method further comprising:
determining the one or more differences between the first state and the second state by identifying at least one of: a change in a number of resources of a first resource type or a change in a first resource configuration.

10. The method of claim 1, wherein the sequence of procedures for implementing the deployment template comprises an ordered set of actions, each action in the ordered set of actions designating a respective procedure to apply to a respective resource, and at least one action in the ordered set of actions designating a customized procedure overriding a default procedure for the respective resource.

11. A deployment management system comprising one or more computing processors and a computer-readable memory storing computer-executable instructions that, when executed by the one or more computing processors, cause the one or more computing processors to:
parse a deployment template comprising:
(i) a declarative portion specifying a plurality of resources to be deployed in one or more computing clouds, the declarative portion including conditional logic for identifying at least one of the computing clouds and instructions for sequencing instantiation of the resources, and
(ii) an imperative portion specifying at least one customization overriding a default procedure for a resource, wherein the default procedure is one of: adding the resource, changing a configuration for the resource, or terminating the resource, the default procedure being included in the declarative portion,
wherein the deployment template is selected, by a user, from a plurality of deployment templates, the selected deployment template comprising the declarative portion and the imperative portion being specified by the user for inclusion in the deployment template;
generate, via modeling the deployment template, a first enumeration of a set of resources deployed in the one or more computing clouds at a first moment in time prior to implementing a transition based on the deployment template, the first enumeration representative of a first state;
generate a second enumeration of the plurality of resources described by the deployment template prospectively representative of a second state conformant with the deployment template at a second moment in time subsequent to implementing the transition;
determine, based on a comparison of the first enumeration and the second enumeration, a difference between the first state and the second state; and
generate a transition plan for transitioning from the first state to the second state, the transition plan comprising a sequence of procedures for implementing the deployment template and the sequence of procedures being stored as respective directed graph vertices of a data structure.

12. The deployment management system of claim 11, the imperative portion further specifying a trigger-based operation, wherein the stored computer-executable instructions, when executed by the one or more computing processors, further cause the one or more computing processors to execute the trigger-based operation responsive to detecting a trigger-event for the trigger-based operation.

13. The deployment management system of claim 12, wherein the stored computer-executable instructions, when executed by the one or more computing processors, further cause the one or more computing processors to execute the trigger-based operation during execution of the sequence of procedures.

14. The deployment management system of claim 11, wherein the stored computer-executable instructions, when executed by the one or more computing processors, further cause the one or more computing processors to:
generate an initial transition plan for transitioning from the first state to the second state;
provide the initial transition plan to a client device;
receive a modification instruction from the client device;
generate a modified transition plan based on the initial transition plan and the received modification instruction; and
use the modified transition plan as the transition plan for transitioning from the first state to the second state.

15. The deployment management system of claim 14, wherein the stored computer-executable instructions, when executed by the one or more computing processors, further cause the one or more computing processors to:
provide the initial transition plan to the client device as a script; and
receive the modification instruction as one of: edits to the script or a replacement script.

16. The deployment management system of claim 11, wherein the stored computer-executable instructions, when executed by the one or more computing processors, further cause the one or more computing processors to manage at least one resource by transmitting authenticated commands to a third-party computing cloud.

17. The deployment management system of claim 11, wherein the stored computer-executable instructions, when executed by the one or more computing processors, further cause the one or more computing processors to execute the transition plan using commands authenticated on behalf of a user.

18. The deployment management system of claim 11, wherein the stored computer-executable instructions, when executed by the one or more computing processors, further cause the one or more computing processors to execute the sequence of procedures included in the transition plan.

19. The deployment management system of claim 11, wherein the deployment template specifies, for each of the plurality of resources, a respective resource type and configuration, and wherein the stored computer-executable instructions, when executed by the one or more computing processors, further cause the one or more computing processors to determine the one or more differences between the first state and the second state by identifying at least one of: a change in a number of resources of a first resource type or a change in a first resource configuration.

20. The deployment management system of claim 11, wherein the sequence of procedures for implementing the deployment template comprises an ordered set of actions, each action in the ordered set of actions designating a respective procedure to apply to a respective resource, and at least one action in the ordered set of actions designating a customized procedure overriding a default procedure for the respective resource.

21. A non-transitory computer-readable medium storing instructions that, when executed by a computing processor, cause the computing processor to:
   parse a deployment template comprising:
      (i) a declarative portion specifying a plurality of resources to be deployed in one or more computing clouds, the declarative portion including conditional logic for identifying at least one of the computing clouds and instructions for sequencing instantiation of the resources, and
      (ii) an imperative portion specifying at least one customization overriding a default procedure for a resource, wherein the default procedure is one of: adding the resource, changing a configuration for the resource, or terminating the resource, the default procedure being included in the declarative portion,
   wherein the deployment template is selected, by a user, from a plurality of deployment templates, the selected deployment template comprising the declarative portion and the imperative portion being specified by the user for inclusion in the deployment template;
   generate, via modeling the deployment template, a first enumeration of a set of resources deployed in the one or more computing clouds at a first moment in time prior to implementing a transition based on the deployment template, the first enumeration representative of a first state;
   generate a second enumeration of the plurality of resources described by the deployment template prospectively representative of a second state conformant with the deployment template at a second moment in time subsequent to implementing the transition;
   determine, based on a comparison of the first enumeration and the second enumeration, a difference between the first state and the second state; and
   generate a transition plan for transitioning from the first state to the second state, the transition plan comprising a sequence of procedures for implementing the deployment template and the sequence of procedures being stored as respective directed graph vertices of a data structure.

22. The computer-readable medium of claim 21, wherein the imperative portion further specifies a trigger-based operation, and wherein the stored computer-executable instructions, when executed by a computing processor, further cause the computing processor to execute the trigger based operation responsive to detecting a trigger-event for the trigger-based operation.

23. The computer-readable medium of claim 21, wherein the stored computer-executable instructions, when executed by the one or more computing processors, further cause the one or more computing processors to:
   generate an initial transition plan for transitioning from the first state to the second state;
   provide the initial transition plan to a client device;
   receive a modification instruction from the client device;
   generate a modified transition plan based on the initial transition plan and the received modification instruction; and
   use the modified transition plan as the transition plan for transitioning from the first state to the second state.

24. The computer-readable medium of claim 21, wherein the sequence of procedures for implementing the deployment template comprises an ordered set of actions, each action in the ordered set of actions designating a respective procedure to apply to a respective resource, and at least one action in the ordered set of actions designating a customized procedure overriding a default procedure for the respective resource.

25. The method of claim 1, wherein at least one procedure comprises transmitting one or more commands to a particular computing cloud associated with one or more resources to be deployed in the particular computing cloud, and wherein the deployment management system is configured to obtain authentication information associated with the particular computing cloud and authenticate, using the authentication information, to effectuate the one or more commands.

26. The deployment management system of claim 11, wherein at least one procedure comprises transmitting one or more commands to a particular computing cloud associated with one or more resources to be deployed in the particular computing cloud, and wherein the deployment management system is configured to obtain authentication information associated with the particular computing cloud and authenticate, using the authentication information, to effectuate the one or more commands.

* * * * *